(12) United States Patent
Sarkar et al.

(10) Patent No.: US 9,496,735 B2
(45) Date of Patent: Nov. 15, 2016

(54) METHODS FOR ELECTRIC BUS CHARGING TO INCREASE BATTERY LIFE

(75) Inventors: Reuben Sarkar, Denver, CO (US); Seamus McGrath, Simpsonville, SC (US); Michael Alan Finnern, Greer, SC (US)

(73) Assignee: Proterra Inc., Greenville, SC (US)

( * ) Notice: Subject to any disclaimer, the term of this patent is extended or adjusted under 35 U.S.C. 154(b) by 722 days.

(21) Appl. No.: 13/825,531

(22) PCT Filed: Sep. 21, 2011

(86) PCT No.: PCT/US2011/052617
§ 371 (c)(1),
(2), (4) Date: May 22, 2013

(87) PCT Pub. No.: WO2012/040369
PCT Pub. Date: Mar. 29, 2012

(65) Prior Publication Data
US 2013/0229153 A1    Sep. 5, 2013

Related U.S. Application Data

(60) Provisional application No. 61/385,114, filed on Sep. 21, 2010.

(51) Int. Cl.
*H02J 7/00* (2006.01)
*B60L 11/18* (2006.01)
(Continued)

(52) U.S. Cl.
CPC ............ *H02J 7/0052* (2013.01); *B60L 1/003* (2013.01); *B60L 3/0046* (2013.01); *B60L 3/0069* (2013.01); *B60L 3/04* (2013.01); *B60L 11/126* (2013.01);
(Continued)

(58) Field of Classification Search
CPC ........... B60L 11/1816; B60L 11/1809; Y02T 90/128
USPC ......................................................... 320/109
See application file for complete search history.

(56) References Cited

U.S. PATENT DOCUMENTS 3,955,657 A    5/1976  Bossi
7,227,336 B1   6/2007  Schalkwijk et al.
(Continued)

FOREIGN PATENT DOCUMENTS

JP    2000-287302 A    10/2000
JP    2006-054958 A    2/2006
(Continued)

OTHER PUBLICATIONS

International search report and written opinion dated Mar. 22, 2013 for PCT/US2012/059611.
(Continued)

*Primary Examiner* — Yalkew Fantu
*Assistant Examiner* — Manuel Hernandez
(74) *Attorney, Agent, or Firm* — Bookoff McAndrews, PLLC

(57) ABSTRACT

The invention provides for an energy storage system that has a first plurality of battery cells that each are capable of a first C-rate. The plurality of battery cells can be charged at an equivalent rate on a kWh/minute basis as a second plurality of battery cells that each are capable of second C-rate, with the second C-rate being higher than the first C-rate. The first plurality of battery cells may have an energy storage capacity which is approximately twice the energy storage capacity for the second plurality of cells.

20 Claims, 14 Drawing Sheets

(51) Int. Cl.
*H01M 10/46* (2006.01)
*H01M 10/44* (2006.01)
*H01M 16/00* (2006.01)
*B60L 1/00* (2006.01)
*B60L 3/00* (2006.01)
*B60L 3/04* (2006.01)
*B60L 11/12* (2006.01)

(52) U.S. Cl.
CPC ............ *B60L 11/184* (2013.01); *B60L 11/185* (2013.01); *B60L 11/1805* (2013.01); *B60L 11/1809* (2013.01); *B60L 11/1816* (2013.01); *B60L 11/1842* (2013.01); *B60L 11/1844* (2013.01); *B60L 11/1846* (2013.01); *B60L 11/1848* (2013.01); *B60L 11/1853* (2013.01); *B60L 11/1859* (2013.01); *B60L 11/1864* (2013.01); *B60L 11/1872* (2013.01); *B60L 11/1874* (2013.01); *B60L 11/1877* (2013.01); *B60L 11/1879* (2013.01); *H01M 10/441* (2013.01); *H01M 10/46* (2013.01); *H01M 16/00* (2013.01); *H02J 7/0068* (2013.01); *B60L 2200/18* (2013.01); *B60L 2200/26* (2013.01); *B60L 2210/10* (2013.01); *B60L 2240/36* (2013.01); *B60L 2240/662* (2013.01); *B60L 2240/667* (2013.01); *B60L 2240/80* (2013.01); *B60L 2250/16* (2013.01); *B60L 2260/58* (2013.01); *H01M 2220/20* (2013.01); *Y02E 60/721* (2013.01); *Y02T 10/6217* (2013.01); *Y02T 10/7005* (2013.01); *Y02T 10/7011* (2013.01); *Y02T 10/7061* (2013.01); *Y02T 10/7072* (2013.01); *Y02T 10/7077* (2013.01); *Y02T 10/7216* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 7,665,559 B2 * | 2/2010 | De La Torre-Bueno | B60K 6/46 180/65.285 |
| 8,324,858 B2 | 12/2012 | Hill et al. | |
| 8,536,825 B2 * | 9/2013 | Kishiyama | H02J 7/0073 180/65.29 |
| 2009/0114463 A1 | 5/2009 | DeVault | |
| 2009/0222143 A1 * | 9/2009 | Kempton | B60L 11/1824 700/291 |
| 2009/0229900 A1 | 9/2009 | Hafner et al. | |
| 2009/0313033 A1 | 12/2009 | Hafner et al. | |
| 2010/0025132 A1 | 2/2010 | Hill et al. | |
| 2010/0213898 A1 | 8/2010 | Hayashigawa | |
| 2013/0110330 A1 * | 5/2013 | Atluri | B60L 1/003 701/22 |
| 2016/0016485 A1 * | 1/2016 | Deisler | G01C 21/26 701/22 |
| 2016/0023649 A1 * | 1/2016 | Muller | G01C 21/26 701/22 |
| 2016/0046204 A1 * | 2/2016 | Oh | H02J 7/34 701/22 |
| 2016/0052420 A1 * | 2/2016 | Kim | G01C 21/34 701/22 |
| 2016/0167641 A1 * | 6/2016 | Yoon | B60W 20/13 701/22 |

FOREIGN PATENT DOCUMENTS

| | | |
|---|---|---|
| JP | 2010-183785 A | 8/2010 |
| JP | 2010-239849 A | 10/2010 |
| JP | 2011-120327 A | 6/2011 |
| WO | WO 2010076608 A1 * | 7/2010 |

OTHER PUBLICATIONS

International search report and written opinion dated May 1, 2012 for PCT/US2011/052617.

* cited by examiner

A SIMPLE ANALOGY

▷ A 110.4 KWh BUCKET OF 3-C SLOWER CHARGING CELLS CAN BE FILLED AS FAST AS A 55.2 KWh BUCKET OF 6-C CELLS UP TO HALFWAY FULL

▷ A DOUBLE SIZED BUCKET OF ENERGY DENSE 3-C CELLS
  ▷ TAKES UP ROUGHLY THE SAME AMOUNT OF SPACE AND WEIGHT
  ▷ HAS LOWER INITIAL COST THAN LTO

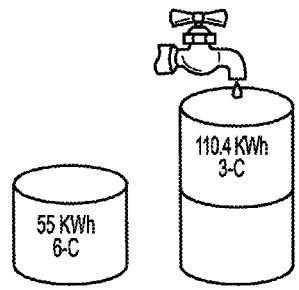

INTUITIVELY OBVIOUS BUT CONVENTIONAL THINKING DOES NOT LEAD YOU HERE

RAPID CHARGE COMPARISON 6C VS. 3C 6C (50Ah) PRISMATIC SYSTEM
CAPABLE OF >5.0 KWh/MIN CHARGE RATES

- LTO CHEMISTRY
   - POWER DENSE
- 6C (50 Ah) = 300 A FOR 10 MINUTES
- >=90% USABLE SOC
- SYSTEM DESIGN REQUIREMENTS
   - 55.2 KWh ENERGY STORAGE CAPACITY
   - 358V NOMINAL
      • 500
      • 420
   - 250A RECOMMENDED STANDARD CHARGE/DISCHARGE
   - 900A RECOMMENDED FASTCHARGE
   - 375A MAX CONTINUOUS DISCHARGE
   - 500A MAX PULSE CHARGE/DISCHARGE RATE 10SEC PULSE
   - 1.84 KW TYPICAL POWER (10SEC PULSE 50% SOC), AT $25^\circ C$
- <10 MINUTES CHARGE FOR
   - EQUTES TO >3.0 KWh/MIN 3C (50Ah) PRISMATIC SYSTEM
CAPABLE OF >5.0 KWh/MIN CHARGE RATES

- LITHIUM IRON PHOPHATE
   - ENERGY DENSE
- 3C (50 Ah) = 150A FOR 20 MINUTES
- >=90% USABLE SOC
- SYSTEM DESIGN REQUIREMENTS
   - 110.4 KWh ENERGY STORAGE CAPACITY
   - 568V NOMINAL
      • 500
      • 420
   - 250A RECOMMENDED STANDARD CHARGE/DISCHARGE
   - 900A RECOMMENDED FASTCHARGE
   - 375A MAX CONTINUOUS DISCHARGE
   - 500A MAX PULSE CHARGE/DISCHARGE RATE 10SEC PULSE
   - 1.84 KW TYPICAL POWER (10SEC PULSE 50% SOC AT $25^\circ C$)
- <10 MINUTES CHARGE TIME FOR 55.2 KWH OF ENERGY
   - RAPID CHARGE ONLY 50% OF USABLE $50^\circ C$ RANGE

C-Rates (Amp-Hours)

C-rates 50Ah

- 0.5C (50Ah) = 25A for 120 minute
- 1C (50Ah) = 50A for 60 minutes
- 2C (50Ah) = 100A for 30 minutes
- 3C (50Ah) = 150A for 20 minutes
- 6C (50Ah) = 300A for 10 minutes

C-rates 20Ah

- 0.5C (20Ah) = 10A for 120 minute
- 1C (20Ah) = 20A for 60 minutes
- 2C (20Ah) = 40A for 30 minutes
- 3C (20Ah) = 60A for 20 minutes
  - Split 900A rapid charge to get 60A max per cell
- 6C (20Ah) = 120A for 10 minutes

Figure 6

|  | 6-C | 3-C |
|---|---|---|
| Chemistry | Lithium Titanate Oxide (LTO) | Lithium Iron Phosphate or NCM hard carbon |
| Cell | 13Ah, 50Ah, 60Ah | 14Ah, 20Ah, 50Ah, 200Ah |
| Nominal Cell Voltage | 2.3V | 3.2V |
| Nominal System Voltage (lower voltage strategy) | 360 – 380 | 384V |
| Nominal Voltage (Higher Voltage strategy) | 736V | 600 – 850V |
| Configuration | Multiple strings are also favored though less are required for current splitting in power dense systems | Multiple string configurations may be used to split high current levels during rapid charge events. |
| Buss Bars & Terminal | Sized to meet specification | Upsize bars to meet specification requirements |
| HV cable | Sized t meet specification requirements | Upsized cables to 120 mm^2 or 4/0 rated for 300A min for voltage ranges 300 – 420V. |
| Active Thermal Management and System Impedance | Lower impedance of LTO cells , 0.4 m-Ohm AC Impedance at 1 Khz results in low temperature rise during charge events | LFP cells have <5 m-Ohm AC Impedance at 1 Khz. Design to limit temperature rise due to system impedance. Upsizing system helps drive down temperature increased during fast charge events. A 55 KWh 3-C system would have considerable temperature rise during a rapid charge event. |
| Cell Tab Welding |  | Need to specify process and weld parameters |
| BMS |  | Fast charge capable BMS |

Figure 7

METHODS FOR ELECTRIC BUS CHARGING TO INCREASE BATTERY LIFE

CROSS-REFERENCE

This application claims the benefit of U.S. Provisional Application No. 61/385,114, filed Sep. 21, 2010, which application is incorporated herein by reference in its entirety.

BACKGROUND

In recent years, hybrid and electric vehicles, which are provided with a battery, have been proposed, and some of them have been put into practice, to effectively use energy, in particular, regenerative energy as environmental measures. Typically, secondary batteries, which have been put to into practice and installed in vehicles so far, include, for example, lead storage batteries, nickel metal hydride batteries, or high powered lithium ion batteries. Some electric vehicles, such as electric cars, charge their batteries by plugging in the electric vehicle at a charging station. Other electric vehicles such as electric trains and light rail cars, are permanently connected to a power source through hardware in the railing or through overhead lines.

Recent trends in integrated transportation systems for electric vehicles, such as bus systems or other public transportation systems, have moved away from the use of permanent electrical connections to electric vehicle, as these systems are an eyesore, are unpopular, are costly to install and maintain, and can be unsafe. Some of these systems do not enable an electrical vehicle to run independent of a railing or overhead line. The speed of charging can be very pertinent for a heavy-duty vehicle, such as a bus, that may be regularly recharged within small time frames. More recent integrated transport systems may use fixed charging stations to rapidly charge heavy duty batteries used in electric vehicles. In one example, an electric vehicle may need to complete a charge in less than ten minutes that is sufficient to enable it to complete its normal route of nine to twelve miles in an hour before having to recharge. Charging an electric vehicle in less than ten minutes, particularly for large, heavy-duty vehicles such as buses, vans, or large trucks, is generally only considered possible with certain types of battery chemistries such as lithium titanate or ultra-capacitors that are capable of a sustained high charge rate or C-rate. However, ultra-capacitors do not contain sufficient energy density to provide the necessary range to complete a given route of this length without recharging. Also, the rapid charge and discharge of batteries capable of high C-rates on a repeated basis may lead to increased wear and decreased life for the batteries, which increases the cost of operation for owners.

Thus, a need exists for energy storage systems and associated methods that can be rapidly charged and provide equivalent performance to existing high C-rate energy storage systems capable of high C-rates while using a different energy storage configuration.

SUMMARY OF THE INVENTION

The invention provides systems and methods for rapid charging of an energy storage system. Various aspects of the invention described herein may be applied to any of the particular applications set forth below or for any other types of vehicles or power sources or for any application requiring rapid charging of an energy storage system. The invention may be applied as a standalone system or method, or as part of an integrated transportation system, such as a bus system or other public transportation system. It shall be understood that different aspects of the invention can be appreciated individually, collectively, or in combination with each other.

One aspect of the invention may be directed to an energy storage system. The energy storage system may have a first plurality of battery cells that each are capable of a first C-rate. The plurality of battery cells can be charged at an equivalent rate on a kWh/minute basis as a second plurality of battery cells that each are capable of a second C-rate, with the second C-rate being higher than the first C-rate. The first plurality of battery cells may have an energy storage capacity which is approximately twice the energy storage capacity for the second plurality of cells.

Another aspect of the invention may be directed at a method of rapid charging an energy storage system. The method may include providing a first energy storage system. The first energy storage system may have a first plurality of battery cells that are capable of a C-rate. The method may also include charging the first energy storage system as at an equivalent rate to a second energy storage system. The second energy storage system may include a second plurality of battery cells that are capable of a second C-rate, with the second C-rate being higher than the first C-rate.

A method of selectively charging an energy storage system is provided in accordance with another embodiment of the present invention. The method may include providing an energy storage system and a charging apparatus. The method may also include receiving information relating to one or more factors affecting charging conditions for the energy storage system. The method may further include charging the energy storage system using the charging apparatus using the information relating to one or more factors affecting charging conditions for the energy storage system. The factors affecting charging conditions for the energy storage system may include at least one of the following: the time of day that the energy storage system will operate in; the forecasted weather for the local area that the energy storage system will operate in; the demand rate of electricity for a utility that supplies electricity to the charging apparatus; the load on the utility grid coupled to the charging apparatus; the remaining level of charge within the energy storage system; and the predicted consumption of the energy storage system before the step of charging the energy storage system may be repeated.

Another aspect of the invention may be directed towards a method of charging an energy storage system. The method may include electrically connecting a charging station to an energy storage system. The energy storage system may be charged at a first rate. Charging of the energy storage system at a first rate may then be stopped. An amount of charge may be expended within the energy storage system. The energy storage system may then be charged at a second rate. The process of expending an amount of charge within the energy storage system during a drop-down period may be performed by at least one of the following: operating one or more devices coupled to the energy storage system, transferring the charge to an alternate energy storage device, transferring the charge back through the charging station; or operating the charger as a charge sink.

A rapid charging system is provided in accordance with an embodiment of the present invention. The system may include an external power source, and may also include an electric vehicle. The electric vehicle may have an energy storage system comprising a first plurality of battery cells each having a first C-rate capability. The first plurality of battery cells can be charged at an equivalent rate on a kWh/min basis as a second plurality of battery cells each having a second C-rate capability which is higher than the first C-rate capability. The system may further include a charging apparatus coupled to the external power source, the charging apparatus further separably coupled with the electric vehicle to charge the first plurality of battery cells each having a first-C-rate capability at one or more C-rates including the first C-rate.

A rapid charging system for an energy storage system in an electric vehicle is provided in accordance with an embodiment of the present invention. The system is operable to determine the current state of charge of the energy storage system with the energy storage system having a charge capacity and comprising a first plurality of battery cells having a first C-rate capability. The system is further operable to receive information related to operation of the electric vehicle. The system can also determine, based on the received information related to operation of the electric vehicle, if charging of the energy storage system is needed for continued operation of the electric vehicle. The system may also determine the duration of a charging event, where the duration of the charging event is constrained by one or more operating parameters of the electric vehicle. The system is further operable to control charging of the electric vehicle during the charging event, wherein the energy storage system is charged at a first C-rate, with the first C-rate being lower than a second C-rate required to fully charge a second energy storage system within the duration of the charging event. The second energy storage system comprises a second plurality of battery cells having a second C-rate capability which is higher than the first C-rate capability. The energy storage system is also not charged to its full charge capacity. For example, the energy storage system may be charged to 40 to 60% of its total capacity for normal operation.

A method of charging an energy storage system is also provided in accordance with an embodiment of the present invention. The method includes determining the current state of charge of the energy storage system, the energy storage system having a charge capacity and comprising a first plurality of battery cells having a first C-rate capability. The method further includes receiving information related to operation of the electric vehicle and determining, based on the received information related to operation of the electric vehicle, if charging of the energy storage system is needed for continued operation of the electric vehicle. The method also includes determining the duration of a charging event; wherein the duration of the charging event is constrained by one or more operating parameters of the electric vehicle. In addition, the method includes controlling charging of the electric vehicle during the charging event, wherein the energy storage system is charged at a first C-rate, with the first C-rate being lower than a second C-rate required to fully charge a second energy storage system within the duration of the charging event and the second energy storage system comprising a second plurality of battery cells having a second C-rate capability which is higher than the first C-rate capability. Furthermore during the controlling of charging of the electric vehicle during the charging event, the energy storage system is not charged to its full charge capacity.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The patent or application file contains at least one drawing executed in color. Copies of this patent or patent application publication with color drawings will be provided by the Office upon request and payment of the necessary fee.

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings.

FIG. 2 illustrates a simplified analogy of filling energy storage "buckets" that may be used to explain concepts used within embodiments of the invention.

FIG. 3 is a rapid charge comparison of two different energy storage systems that use different configurations to achieve equivalent >5 kWh/min charge rates.

FIG. 6 is a comparison of current limits for cells of different Ah ratings and different C-rates according to an embodiment of the invention.

FIG. 7 is a chart which provides different design configurations according to an embodiment of the invention.

DETAILED DESCRIPTION OF THE INVENTION

The invention provides systems and methods for rapid charging of an energy storage system. Various aspects of the invention described herein may be applied to any of the particular applications set forth below, for electric or hybrid vehicles, or for any other types of vehicles. The energy storage system may comprise the use of an alternative energy storage configuration which allows for equivalent charging rates to existing high-C configurations, and may have various arrangements and configurations. Various aspects of the invention described herein may be applied to any of the particular applications set forth below or for any other types of vehicles or power sources or for any application requiring rapid charging of an energy storage system. The invention may be applied as a standalone system or method, or as part of an integrated vehicle system. It shall be understood that different aspects of the invention can be appreciated individually, collectively, or in combination with each other.

Figure 1:
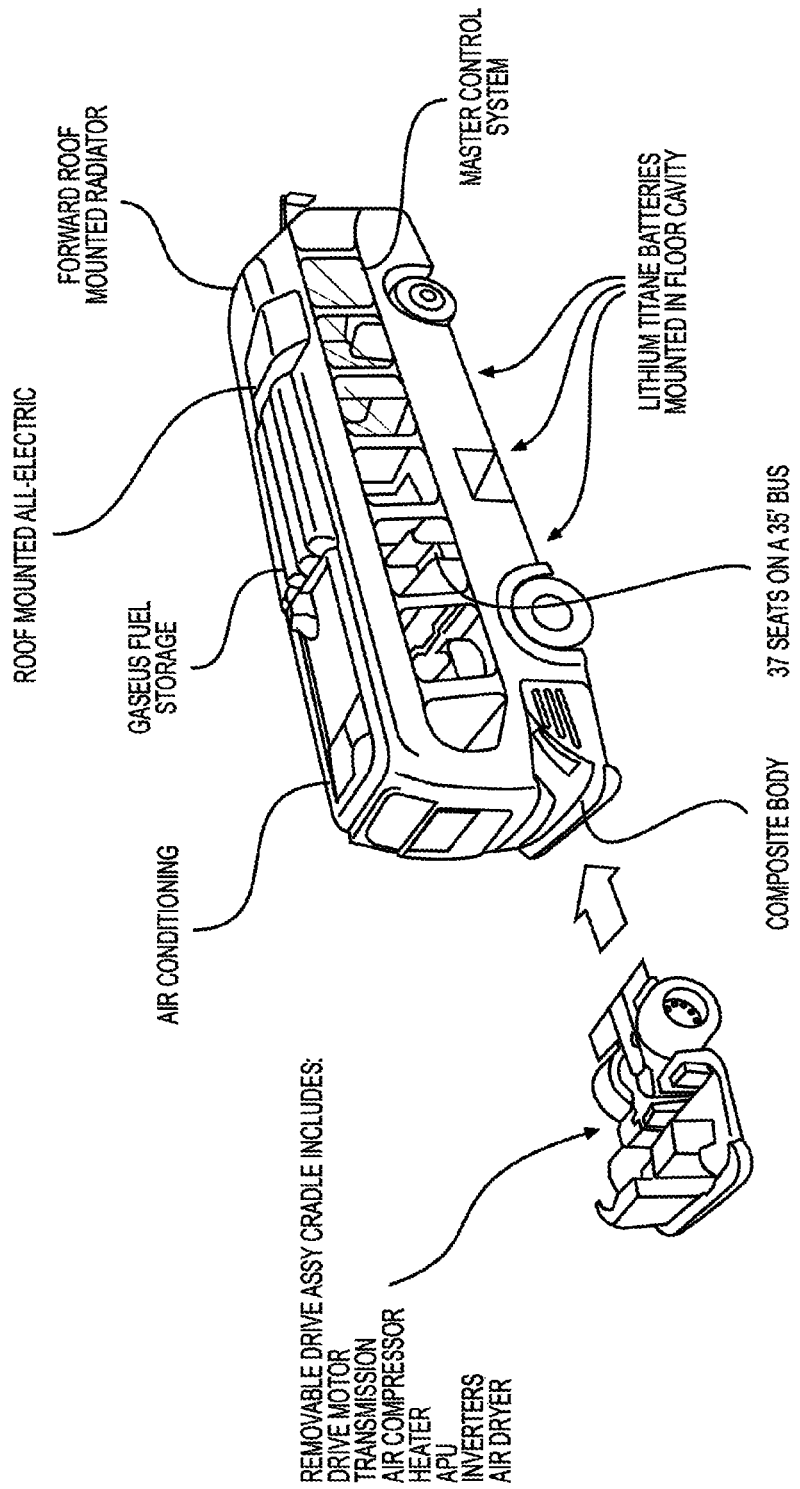
FIG. 1 shows a schematic of a bus with various features in accordance with one embodiment of the invention.

For example, electric vehicles powered by the system may include a transit bus with various features as shown in the schematic in FIG. 1, in accordance with one embodiment of the invention. The features of the bus may be applied to other heavy-duty or high occupancy vehicles, wherein "heavy-duty vehicles" may include a school bus, a delivery van, a shuttle bus, a tractor trailer, a class 5 truck (weighing 16,001-19,500 lbs., two-axle, six-tire single unit), a class 6 truck (weighing 19,501-26,000 lbs., three-axle single unit), a class 7 truck (weighing 26,001-33,000 lbs., four or more axle single unit), a class 8 truck (weighing 33,000 lbs. and over, four or less axle single trailer), a vehicle with a GVWR weighing over 14,000 pounds, a vehicle with a cargo to driver mass ratio of 15:1 or greater, a vehicle with six or more tires, a vehicle with three or more axles, or any other type of high occupancy or heavy-duty vehicle.

A heavy-duty vehicle may have a propulsion power source, which includes batteries. In some embodiments of the invention, the heavy-duty vehicle may have one or more additional power sources, such as a combustion engine or a fuel cell. The heavy-duty vehicle may be an electric battery-powered vehicle or a hybrid electric vehicle, and may be able to use the same basic battery configuration, drive motor, and controller, regardless of whether the vehicle is an all-battery vehicle or a hybrid vehicle.

The propulsion power source for a heavy-duty vehicle may include one or more battery assembly. A battery assembly may provide high voltage power to the traction motor, high power accessories, and low voltage accessories in the vehicle through the use of a converter. In one implementation of the invention, cells may be put in parallel to reduce cost of battery management systems since each cell voltage may be measured. However, in some other embodiments, with larger capacity cells, paralleling batteries before placing them in series may not be necessary. The use of larger capacity cells may increase the safety of the entire assembly without adding cost to the battery management system. Thus, batteries may be arranged in series or parallel, or any combination thereof. Such battery connection flexibility may also allow flexibility in battery placement. Such flexibility of battery placement may be beneficial wherever the batteries are distributed on the vehicle.

In some embodiments, a heavy-duty vehicle may travel a predetermined route, and stop at predetermined points for recharging. See, e.g., U.S. Pat. No. 3,955,657, which is hereby incorporated by reference in its entirety.

In one embodiment of the invention, the propulsion power source of a heavy-duty vehicle may include lithium iron phosphate (LFP) or hard carbon/nickel cobalt manganese oxide (NCM) battery cells. In some implementations, the propulsion power source may include battery cells that are only lithium iron phosphate batteries or NCM hard carbon battery cells without requiring any other types of battery cells. The lithium ion phosphate or NCM hard carbon battery cells may include any format or composition known in the art.

A heavy-duty vehicle such as the transit bus shown in FIG. 1 may be used as part of an integrated transportation system utilizing electric vehicles, such as bus system or other public transportation system. The heavy-duty electric vehicle may operate on a relatively fixed transit route on which the vehicle must complete its entire route before coming back to a specific location to recharge. The recharging of the electric vehicle's batteries should be completed in a short amount of time to minimize vehicle 'down time' and maximize the operational time of the electrical vehicle in the field. For example, the electric vehicle may need to complete a charge in less than ten minutes that is sufficient to enable it to complete its normal route of nine to twelve miles in an hour before having to recharge. Charging a vehicle in less than ten minutes, especially a large heavy duty vehicle is generally considered possible only with high C-rate chemistries such as lithium titanate or ultra-capacitors. According to conventional wisdom, the rate at which an energy storage system can be charged may be considered to be directly proportional to the C-rate of the battery cells contained in the system. The C-rate measures the charging or discharging rate of a cell or battery, expressed in terms of its total storage capacity in Ah or mAh. For example, a C rate (1 C) may mean that a 50 Ah battery would provide 50 A for one hour if discharged at a 1 C rate. The same battery discharged at 0.5 C would provide 25 A for two hours. At 2 C, the 50 Ah battery would deliver 100 A for 30 minutes. At 6 C, the same battery would provide 300 A, but only for 10 minutes. 1 C is often referred to as a one-hour discharge; a 0.5 C would be a two-hour discharge, and a 0.1 C a 10-hour discharge.

0.5 C (50 Ah)=25 A for 120 minutes

1 C (50 Ah)=50 A for 60 minutes

2 C (50 Ah)=100 A for 30 minutes

3 C (50 Ah)=150 A for 20 minutes

6 C (50 Ah)=300 A for 10 minutes

According to conventional approaches, a system containing 6 C battery cells is generally considered to be capable of higher "rapid" charge rates whereas a system comprised of 3 C battery cells is considered less capable of achieving similar charge rates without resulting significant loss of cell life. This is based upon the conventional paradigm that energy storage system charge rates are directly related to the C-rate of the battery cells used within the system. While this definition of charge rates holds at the individual cell level, charge rates start to become dependent upon additional variables when battery cells are designed into energy storage systems comprising modules, packs, strings, and other related hardware and software.

Conventional approaches may also seek to minimize the amount of energy storage on board the electric vehicle. Increasing the energy storage capacity of a vehicle system by doubling the number of battery cells within the system may result in a doubling of mass and volume for the battery cells. This can create a number of problems for electric vehicles, as the battery cells may need to be mounted in a specific location of the vehicle, such as within a floor cavity, in specialized compartments within the floor of a bus, or integrated within other parts of the electric vehicle, and may no longer fit within the specified area. In addition, the increased mass of the battery cells can result in increased drag and reduced acceleration for the vehicle, reduced range for the vehicle, and other impediments to the vehicle's performance.

The usable state of charge, or SOC, left within the battery cells is generally minimized in conventional approaches to battery cell configurations within electric vehicles. For example, upsizing the size of an energy storage system may be seen as moving in the wrong direction if a lesser amount of storage can achieve the required range requirements. The excess capacity, if not properly used, may be viewed by conventional approaches as extraneous to energy storage system requirements and may also add additional costs to the system related to the purchase and integration of additional battery cells.

One embodiment of the invention provides an energy storage system that can be rapidly charged and provide equivalent performance to existing high C-rate energy storage systems while using a different energy storage configuration. The drawing in FIG. 2 illustrates a simplified analogy of filling energy storage 'buckets' that may be used to explain concepts used within embodiments of the invention. Doubling the energy storage capacity of the system effectively doubles the size of the 'bucket' that is being filled by a rapid charge 'spigot', except that only half of the larger bucket can be filled in the same amount of time it would take to fill the original bucket. The existing 'bucket' (or energy storage system) to the left utilizes 6 C battery cells for a total SOC of 55 kWh. In comparison, the larger 'bucket' to the right utilizes slower charging 3 C cells with a total SOC of 110.4 kWh, for roughly double the total capacity of the first bucket. Intuitively, the 110.4 kWh 'bucket' can be filled halfway using the rapid charge 'spigot' in the same amount of time it would take to completely fill the 55 kWh 'bucket'. This allows for roughly equivalent rapid charging times of the two 'buckets' for the same amount of SOC, with the difference being that the 110.4 kWh 'bucket' is only half full, while the 55 kWh 'bucket' is completely full.

Continuing with the bucket analogy, doubling the energy storage capacity of the 'bucket' would intuitively lead to a corresponding doubling of the space and weight that the 'bucket' would occupy. However, a double-sized 'bucket' or energy storage system utilizing energy dense 3 C battery cells rather than power dense 6 C cells can be designed to take up roughly the same amount of space and weight as the 55 kWh 'bucket' or energy storage system by utilizing different cell chemistries, system designs, modifications to the rapid charging scheme, and other changes.

FIG. 3 is a rapid charge comparison of two different energy storage systems that use different configurations to achieve equivalent >5 kWh/min charge rates. The 6 C energy storage system utilizes a power-dense chemistry which allows for rapid charging of an electric vehicle, and a long battery life. For example, a lithium titanate chemistry or other battery chemistry known in the art or later developed may be used within the 6 C energy storage system. The 6 C energy storage system may be able to charge to a very high state of charge within minutes. For instance, the power source may be able to charge to over 95% state of charge within ten minutes by charging >5.0 kWh/min for a period of ten minutes. This would allow an electric vehicle using the 6 C storage system to complete an exemplary transit route of nine to twelve miles while only charging during layovers of ten minutes or less. See U.S. Patent Application No. 61/076,480 entitled "Vehicle Battery Systems and Methods" for additional details, which is hereby incorporated by reference in its entirety.

Instead of the power-dense lithium titanate chemistry used in the 6 C energy storage system, the 3 C energy storage system utilizes an energy-dense chemistry to achieve an equivalent charge rate while also providing equivalent power and performance to complete a similar transit route as described above. An embodiment of the invention uses a lithium iron phosphate or hard carbon/nickel cobalt manganese oxide (NMC) battery chemistry for the battery cells in the energy storage system, but other battery chemistries with similar characteristics known in the art or later developed may also be used. The 3 C energy storage system stores a larger amount of energy stored per unit of volume by using an energy-dense chemistry, thus allowing for the exemplary 110.4 kWh system to occupy a comparable volume and mass as the 55.2 kWh power-dense system using a lithium titanate chemistry.

Rather than focusing on the specific C-rate for the battery cells as a measure of the charging rate, embodiments of the invention focus instead on achieving equivalent rapid charge amounts and times as existing conventional systems by only partially charging an energy storage system having a greater energy storage capacity. While battery cells capable of a lower C-rate will individually charge at a slower rate than those capable of a higher C-rate, the energy storage system as a whole can be redesigned to accommodate the slower charging times for the individual battery cells while allowing the energy storage system as a whole to rapid charge to equivalent usable levels as an energy storage system using battery cells capable of a higher C-rate. For example, an exemplary energy storage system with double the overall storage capacity could rapid charge to >50% of its usable SOC range, which would offer an equivalent SOC to fully charging a energy storage system with half the capacity. The exact system size and SOC cycling range may be based upon the specific application of the energy storage system such as the route range of the electric vehicle using the energy storage system, as well as the specific charging requirements for the application.

It should be understood that while FIG. 3 provides specific details about the configuration and design requirements for energy storage systems according to embodiments of the invention, various modifications can be made thereto and are contemplated herein. For example, FIG. 3 describes the energy storage systems as utilizing battery cells in a prismatic cell configuration, but other battery cell configurations could also be used, including, but not limited to cylindrical cells, button cells, pouch cells, and other configurations known to persons of skill in the art. Various modifications could also be made to the configuration of the energy storage system such as using different C-rate or Ah battery cells, battery chemistries, and storage capacities. Also, while the configuration of the energy storage system in FIG. 3 describes charging requirements for a heavy-duty electric vehicle that travels on an exemplary transit route of 9-12 miles, modifications to the range of the system, charging times, usable SOC, amperage and voltages used in rapid charging, and others would be apparent to a person of skill in the art, and it is contemplated that the invention will also cover such modifications, variations, and equivalents.

Figure 4:
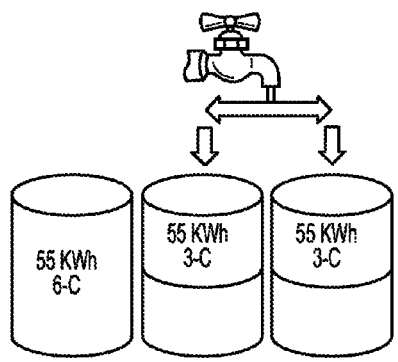
FIG. 4 illustrates a second simplified analogy of filling energy storage "buckets" that can be used to explain concepts used within embodiments of the invention.
Figure 5:
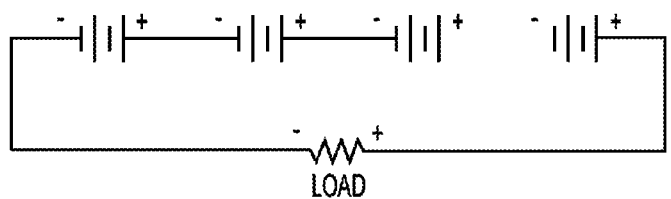
FIG. 5 is a simplified drawing that illustrates potential limitations that may arise in an energy storage system utilizing a series configuration of battery cells, modules, packs, and strings.

The drawing in FIG. 4 illustrates a second simplified analogy of filling energy storage 'buckets' that can be used to explain concepts used within embodiments of the invention. Similar to the drawing in FIG. 2, a rapid charge 'spigot' is used to fill energy storage systems, or 'buckets' with different energy storage configurations. The existing 'bucket' (or energy storage system) to the left utilizes 6 C battery cells for a total SOC of 55 kWh. However, instead of a single double-size 'bucket' on the right, a more accurate analogy would be to simultaneously fill two 'buckets' of equivalent size in parallel, with the two 'buckets' formed from slower-charging 3 C battery cells. The reason for this change is that an energy storage system of 3 C battery cells might not be capable of rapid charge to the same extent as an energy storage system utilizing 6 C battery cells if all the battery cells, modules, packs, and strings used in the energy storage system were entirely in series, or had a limited amount of parallel circuits. For example, FIG. 5 is a simplified drawing that illustrates potential limitations that may arise in an energy storage system utilizing a series configuration of battery cells, modules, packs, and strings. In FIG. 5, a group of battery cells is connected in series with a load. Connecting the battery cells in series provides an equivalent voltage of the sum of the voltages of all the battery cells, but the Ah and current carrying capacity of only one battery cell. For example, if the battery cells in FIG. 5 were 12V, 20 Ah battery cells, the four battery cells in series would provide 48V, but with the same Ah, since the same current flows equally through all cells in the chain. Continuing with this example on a larger scale, all cells in a series configuration will see the maximum current (excluding resistive losses) during rapid charging, regardless of the amount of upsizing of the system used. Similarly, modules placed in series will also have cells that see the same amount of current. This can become a problem because the current limit that each cell can take is not unlimited, but is rather a function of both its Ah rating as well as its C-rate. Excess amperage in charging a battery cell can result in the battery being charged too rapidly, with the batteries at risk of being overcharged, overheating, or having their usable lifetime reduced. This consideration can result in additional design considerations beyond merely doubling the storage capacity of the energy storage system in question, as discussed in more detail below. Nonetheless, it may still be possible to use low Ah battery cells in series to increase the storage capacity of the energy storage system while achieving a similar power uptake. The addition of the battery cells in series results in a higher series voltage, meaning that the amount of current needed to achieve a particular power uptake can be reduced. Thus, if the electric vehicle is capable of using higher voltages, it may be possible to use a single string configuration with a lower Ah series set of battery cells.

FIG. 6 is a comparison of current limits for cells of different Ah ratings and different C-rates according to an embodiment of the invention. The formulas to the left show different C-rates for 50 Ah battery cells, with different C-rates resulting in different amperage outputs and inputs for a given amount of time. At 3 C, a 50 Ah battery cell would provide 150 A for 20 minutes and also be only able to charge at 150 A or less. In comparison, at 3 C, a 20 Ah battery cell could only receive a rapid charge of 60 A. As current fast charge systems may use a recommended fast charge amperage much higher than 150 A or 60 A, some level of parallel circuitry may be added at the cell, module, pack, or string level to help divide the current going into each cell into a lower level. As shown by the comparison of the current limits for 50 Ah and 20 Ah battery cells, use of lower Ah cells may require further current splitting, thus adding additional design considerations to the energy storage system. For example, the system may employ parallel cell configurations at the cell, module, pack, or string level to help reduce the current reaching each cell during a rapid charge event.

A method of charging an energy storage system is also provided in accordance with an embodiment of the present invention. The method includes determining the current state of charge of the energy storage system, the energy storage system having a charge capacity and comprising a first plurality of battery cells having a first C-rate capability. The method further includes receiving information related to operation of the electric vehicle. This information may be route information, information relating to the current capacity of the battery, short term or long-term modifiers to the usage or operation of the electric vehicle, route type (CBD, COM, ARTERIAL), the route profile (flat, hilly, urban), base passenger load profile, historical HVAC loads, time of day changes, time of week changes, the desired reserve levels of SOC, expected electricity costs, and others. The method further includes determining, based on the received information related to operation of the electric vehicle, if charging of the energy storage system is needed for continued operation of the electric vehicle. If so, the electric vehicle may return to a charging station to charge the energy storage system. The method also includes determining the duration of a charging event; wherein the duration of the charging event is constrained by one or more operating parameters of the electric vehicle. For example, the duration of the charging event may be limited by the length of the vehicle's route. In an hourlong route, the electric vehicle may only be allotted ten minutes or less to charge its energy storage system to a sufficient level to complete its route. The duration of the charging event may be constrained by other parameters, including the availability of charging stations, the schedule of operation of the vehicle, characteristics of the battery cells used in the energy storage system, and others. In addition, the method includes controlling charging of the electric vehicle during the charging event, wherein the energy storage system is charged at a first C-rate, with the first C-rate being lower than a second C-rate required to fully charge a second energy storage system within the duration of the charging event. For example, the energy storage system may be charged at a 3 C charge rate, instead of a 6 C charge rate that would be required to fully charge an equivalent energy storage system, where the equivalent energy storage system includes a second plurality of battery cells having a second C-rate capability which is higher than the first C-rate capability. The energy storage system may complete charging within the duration of the charging event in the same time required to charge the equivalent storage system to full charge capacity. However, the energy storage system is not charged to its full charge capacity, but because its overall charge capacity is larger than that of the equivalent system, the total amount of charge available for operation of the electric vehicle remains the same.

The charge and discharge rates for battery cells described herein are ideal, and may also be affected by other factors, including temperature, the internal impedance of the battery cells, whether the discharge is done intermittently or continuously, the cycle life of the battery cells, and others.

In addition to changes to the serial or parallel cell, module, pack, or string arrangements used in the energy storage system, embodiments of the invention may involve the redesign of other components used within the electric vehicle or charging apparatus to meet continuous and maximum current and power charge/discharge requirements. FIG. 7 is a chart which provides different design configurations according to an embodiment of the invention. The 3 C system may use a lithium iron phosphate or NCM hard carbon chemistry, and may use battery cells with different Ah ratings. In various embodiments, all battery cells used in the energy storage system may have the same Ah rating, or the battery cells used in different module, pack, or string arrangements may have different Ah ratings. The nominal cell voltage for a 3 C system may be 3.2V, but higher or lower voltages may also be used. For example, higher voltage cells at equivalent Ah ratings may allow for voltage targets to be achieved with lower added energy capacity. If additional capacity is needed, it may be added through additional parallel modules, packs, or strings which reduces the current to each cell. A lower or higher system voltage can also be used, depending upon the configuration of other components used within and in conjunction with the energy storage system. For example, a lower voltage strategy may use a nominal system voltage of 384V, while a higher voltage strategy can use a higher voltage of between 600-800V. The use of higher voltage cells may also allow for higher voltages to be reached with lower incremental energy storage capacity at an equivalent cell Ah rating. Shifting the system voltage to a higher range can allow for the use of high voltage components, such as a high voltage motor rated for either 600V, 600 A or 1200V, 300 A. Additional high voltage motor configurations with different voltage and amperage ratings and different nominal system voltages may also be used in embodiments of the invention.

Other components that can be redesigned for use in a rapid charging, low C-rate system include the buss bars & terminal, high voltage (HV) cable, active thermal management systems, cell tab welding, the battery management system (BMS), distribution and junction boxes, the 24V converter, HVAC, the charging blade and head, and others. Embodiments of the invention may use modified versions of components or equipment described in U.S. Patent Applications 61/328,143 and 61/077,452 titled, "Fast Charge Stations for Electric Vehicles in Areas with Limited Power Availability" and "Charging Stations for Electric Vehicles", which are hereby incorporated by reference in their entirety. For example, upsized buss bars and terminals may be used within battery packs or charging stations to meet specification requirements. The size of high voltage cables may be upsized to have a conductive cross-section of 120 mm$^2$ or 4/0 rated for 300 A min for a voltage range between 300-420V. Active thermal management systems and additional parallel configurations can also be used to help compensate for the higher cell impedance of LFP cells as compared to LTO cells at comparable levels, and also limit the degree of temperature rise during a rapid charging event. Upsizing the energy storage system can help to drive down the temperature increase in the battery cells during rapid charging events by allowing for the battery cells to see lower currents and an overall reduced system impedance due to additional parallel configurations at the cell, module, pack, or string level to help reduce the current reaching each cell during rapid charging. Other thermal management techniques may also be used at the module or pack level, including the use of integrated cooling plates from a main vehicle electrical cooling system or other cooling features known in the art, such as various heat sink arrangements or the use of convection cooling. Active cooling techniques, such as fluid cooling, which may utilize fans, the passage of air, liquid, or other fluids, may also be utilized. The battery cells used in a rapid charge energy storage system may also use a weld plate to accurately locate and hold the terminals to the case of a module to reduce fatigue stress cracks in the cell tabs. A fast charge capable BMS may also be integrated into the packs and/or modules to give early warning to potential problems with weaker battery cells within a string. The BMS can give accurate feedback on cell voltages and temperatures within the modules in order to ensure a healthy battery pack and may be adapted to monitor the increased voltages during the rapid charging process. If there are any problems with a particular string, those modules can be automatically removed from service and the vehicle can operate on reduced capacity until the end of the day if necessary. The BMS can disconnect a battery string if a fault is detected. Even if an entire battery string is connected, the vehicle is capable of operating.

Embodiments of the present invention may also use multiple string configurations to split high current levels during rapid charge events. The use of a single string configuration can mean that each cell within the string sees the maximum current despites doubling the size of the energy storage system. A higher string count may also be more favorable for energy-dense systems, but other configurations and battery arrangements may also be used.

Figure 8:
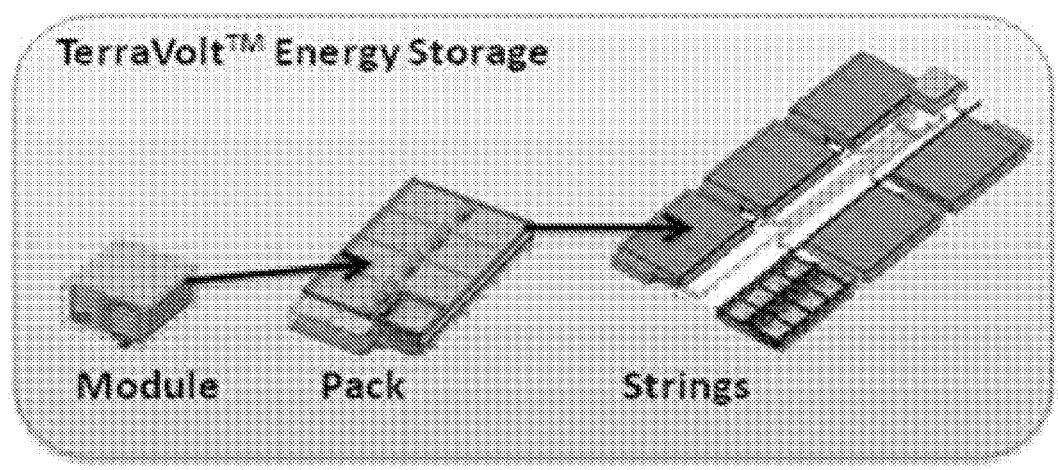
FIG. 8 shows an example of a battery arrangement.

FIG. 8 shows an example of a battery arrangement. A module may fit within a battery pack, which may fit within a battery assembly, which may include strings of battery packs connected in series.

Figure 9:
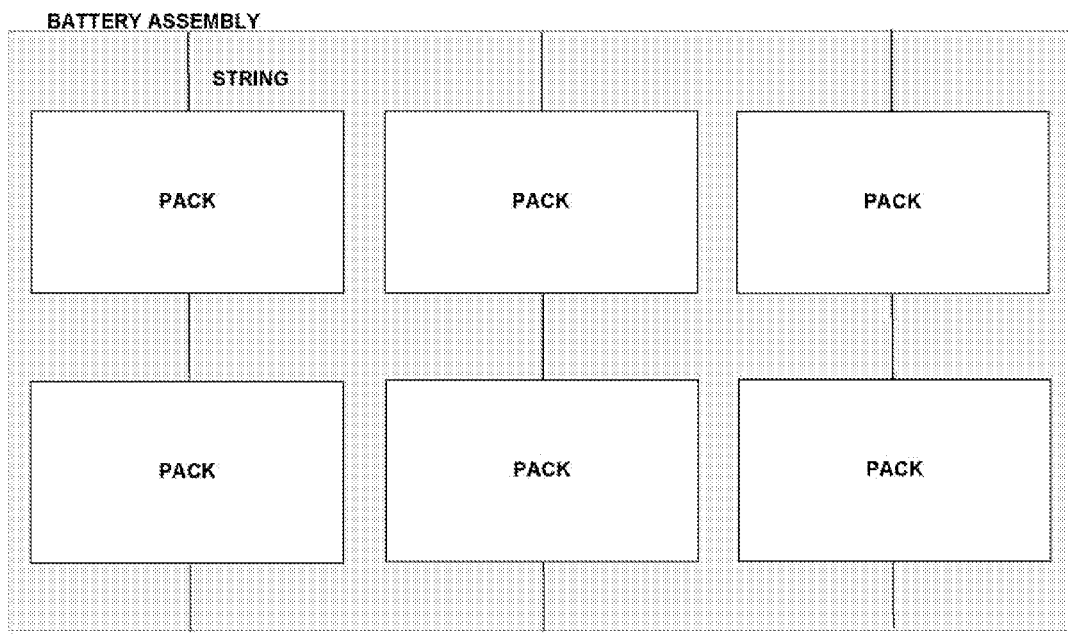
FIG. 9 shows a high level outline of a battery arrangement that may be used as a propulsion power source in accordance with one embodiment of the invention.

FIG. 9 shows a high level outline of a battery arrangement, which may be used as a propulsion power source in accordance with one embodiment of the invention. The battery assembly in a vehicle may be designed to have any number of main battery strings. For example, in one embodiment, the battery assembly may include three main battery strings. Each string may consist of a number of battery packs. For example, there may be two packs per string. Each string may or may not have the same number of packs. For example, each string may have two packs. In another example, one string may have two packs, another string may have one pack, and another string may have five packs. The strings may be arranged so that they are connected in parallel. Alternatively, the strings may allow the packs to be connected in series.

Figure 10:
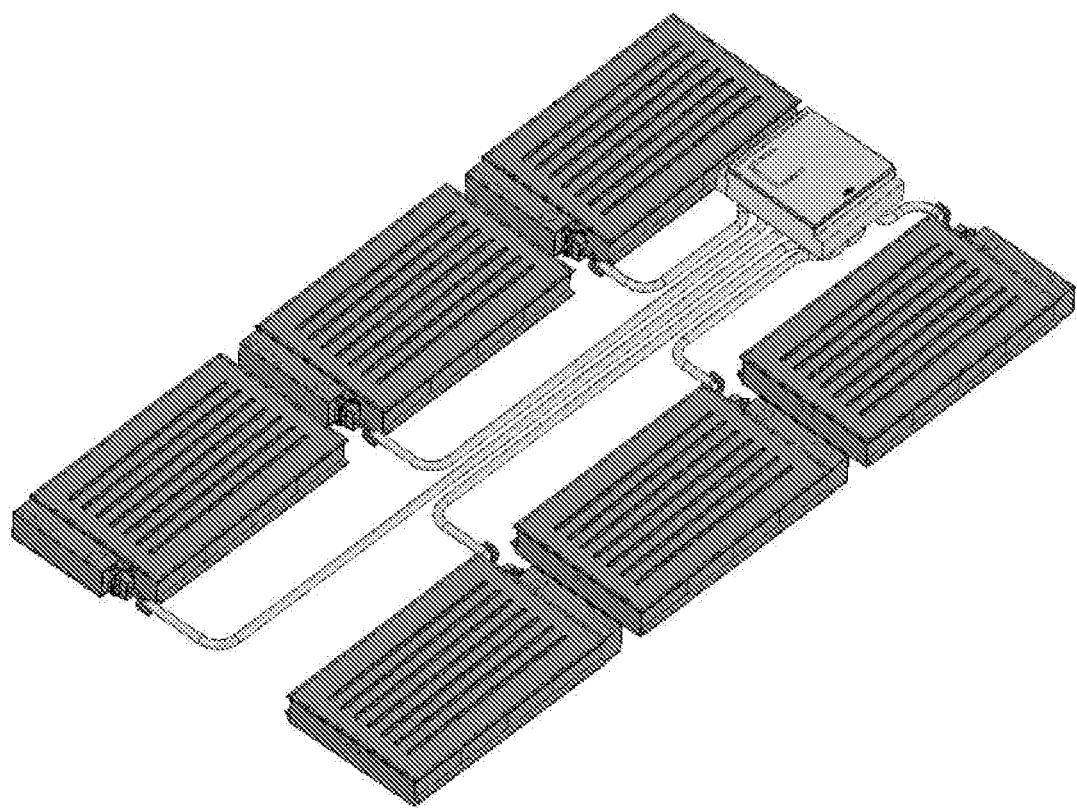
FIG. 10 shows a schematic of a battery assembly that may be used to propel a heavy-duty vehicle.

FIG. 10 shows a schematic of a battery assembly that may be used to propel a heavy-duty vehicle, such as a bus, in accordance with one embodiment of the invention. In some cases, the packs may be electrically arranged in a staggered configuration to match cabling resistances and ensure similar operation of each string. One example of a staggered configuration is a group of four packs (pack 1, pack 2, pack 3, pack 4 lined up from near to far), that are arranged into two strings. The first string may connect pack 1 and pack 4 together, while the second string may connect pack 2 and pack 3 together. Each pack may have the same amount of wire connecting the two batteries even if each pack is a different distance from the junction area. Each pack may be individually mounted from below the vehicle into one, two, or more cavities built into the floor.

A pack may include boxes or containers that enclose the contents of the pack. The containers may have any shape or configuration that may enable them to hold the contents of the battery pack. The containers may be watertight and may be formed of a material that will not oxidize or burn when exposed to an electric arc. For example, the material for the containers may be a 3 CR12 stainless steel to protect against corrosion from road salts, inhibit oxidation when in contact with an electric arc, and help with material fatigue. Other materials, such as composite materials, may be used that may have similar features.

Figure 11:
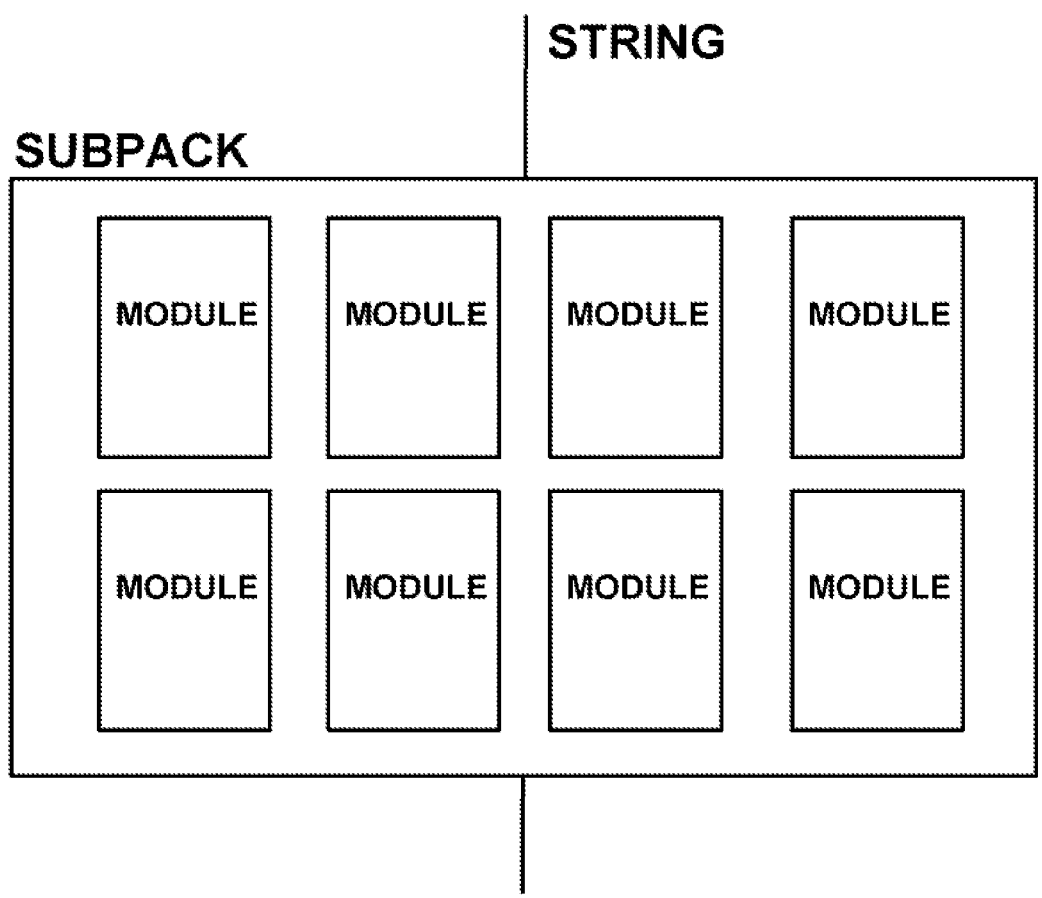
FIG. 11 shows an example of a battery pack of a string.

FIG. 11 shows an example of a battery pack of a string. A battery pack may include one or more modules. For example, battery packs may each contain eight modules. Each battery pack of a battery assembly may or may not include the same number of modules. For example, one battery pack may include six modules, while another battery pack may include eight modules, while another battery pack may also include eight modules.

The pack design may accommodate safety and size. In a pack design, a number of factors may be considered including detection, containment, isolation, and suppression. Each of these areas may address a group of potential problems that could occur and may help to meet all applicable Federal Motor Vehicle Safety Standards.

A BMS may be a primary detection method of a problem with a particular cell, module, pack, or string. The BMS may detect when a failure occurs and may be able to direct the battery assembly to disconnect portions of the battery assembly, such as individual battery strings, where the failure may have occurred, in order to prevent other portions of the battery assembly from being compromised and to allow continuous operation of the vehicle. The BMS may communicate with and within each pack to achieve the desired level of detection and management.

The pack may be watertight and may provide containment. The pack may be contained within a container or box that may protect the pack from external elements that may damage the contents of the pack. The pack container may be designed to protect the pack for a long period of time. In addition to protecting the contents of the pack from external threats, the container of a pack may contain any failures that may occur within a pack, in order to prevent damage to other packs or portions of the vehicle.

Dividers between the modules may protect modules from other modules that may have a failure, thus providing isolation. If a module were to fail, the dividers may protect other modules from the failed module. The dividers may or may not be integrated into the pack container structure and may be made of a material that may not oxidize when exposed to electrical arcs or high temperatures. FIG. 8 shows an example of a pack container with module dividers.

Suppression may not necessary due to the very limited airspace within the enclosure. In some cases, suppression configurations may be added, which may require providing an exhaust path for the suppression material. The exhaust path may consist of an opening drilled in a section of the pack with a spring-return shield and a gasket material to seal the exhaust opening when it is not in use.

In some embodiments, a battery pack may include modules with integrated heat sinks, cooling features such as a cooling plate, module retainers, buss bars to attach modules together, and one or more small compartments that may house the BMS boards, relays, and fuses. The compartment may or may not be substantially thermally and/or physically isolated from the modules. Interconnection wiring may run to a watertight connector in the small end-box that can disconnect power to the relay, thus making the terminals of the connector safe when the main cable is disconnected. The pack may include integrated cooling features in addition to cooling features of the modules. In some implementations, integrated cooling plates can provide cooling from a main vehicle electrical cooling system. In some embodiments, the cooling plates may preferably be maintained below 43° C. for operation of the batteries. Other cooling features known in the art, such as various heat sink arrangements or use of convection cooling may be used in a battery pack. Active cooling techniques, such as fluid cooling, which may utilize fans, the passage of air, liquid, or other fluids, may also be utilized.

A thermal shield consisting of a spray-on ceramic coating on the lowest point of the packs may be applied to packs exposed to the underside of the vehicle or anywhere else where radiated heat may be a concern.

Such a battery pack design may have the following benefits: low cost integration, design for safety, ease of assembly, may be maintenance free, and may have simple mounting.

Figure 12:
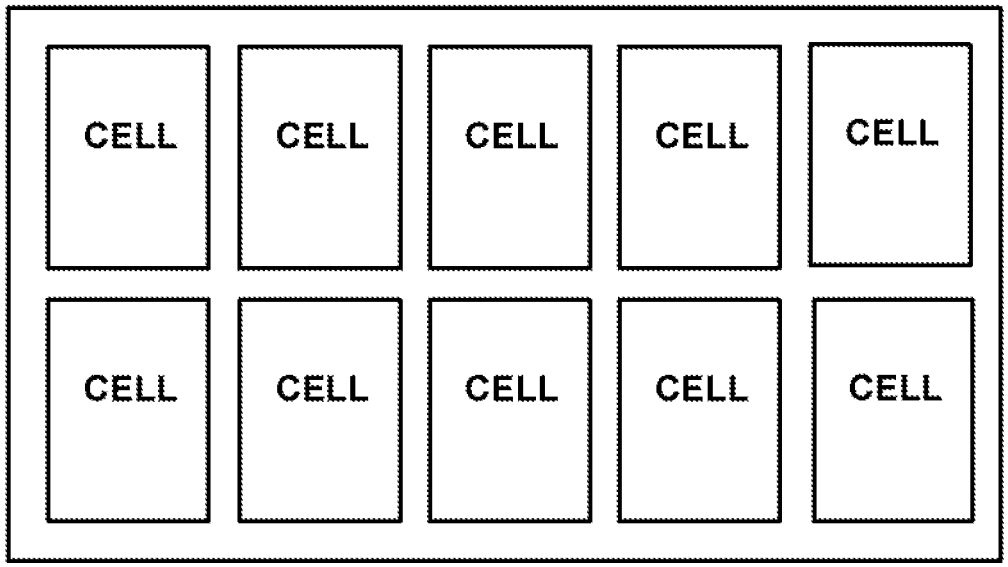
FIG. 12 shows a high-level outline of a battery module.

FIG. 12 shows a high-level outline of a battery module. A battery module may include one or more battery cells. In a preferable embodiment, the battery cells may be lithium iron phosphate or NCM hard carbon battery cells. In other embodiments, the battery cells may have other battery chemistries known in the art. For example, each module may comprise ten battery cells. Each module may or may not include the same number of battery cells. For example, one module may include eight battery cells, while another module may include twelve battery cells, and another module may include thirteen battery cells, while yet another module may include thirteen battery cells.

The cells may have any arrangement or connection within the module. For example, the cells may all be connected in series. Alternatively, the cells may be connected in parallel. Or in some cases, the cells may be connected in a combination of series or parallel within the module.

The battery cells may have various specifications, such as various voltages. For example, each cell for a lithium iron phosphate battery may be at 3.2 $V_{nominal}$, 50 Ah giving a nominal energy of 160 Wh. Each cell, such as lithium ion batteries or other types of batteries, may or may not vary in its specifications. In some embodiments, the cells may be prismatic cells. Each prismatic cell may be housed in a specialized Mylar/foil pouch and may be somewhat fragile. The module housing can be designed to and protect the cells from outside damage, making them easier to handle, and providing cooling support.

The modules may include cooling features. For example, modules may have integrated aluminum cooling fins placed between each cell. In other examples, cooling plates may all link up to an anodized aluminum backplane that can then be cooled to support even cooling through the module. Other cooling features known in the art may be used, such as various heat sink arrangements, forced convection cooling, and so forth.

Figure 13:
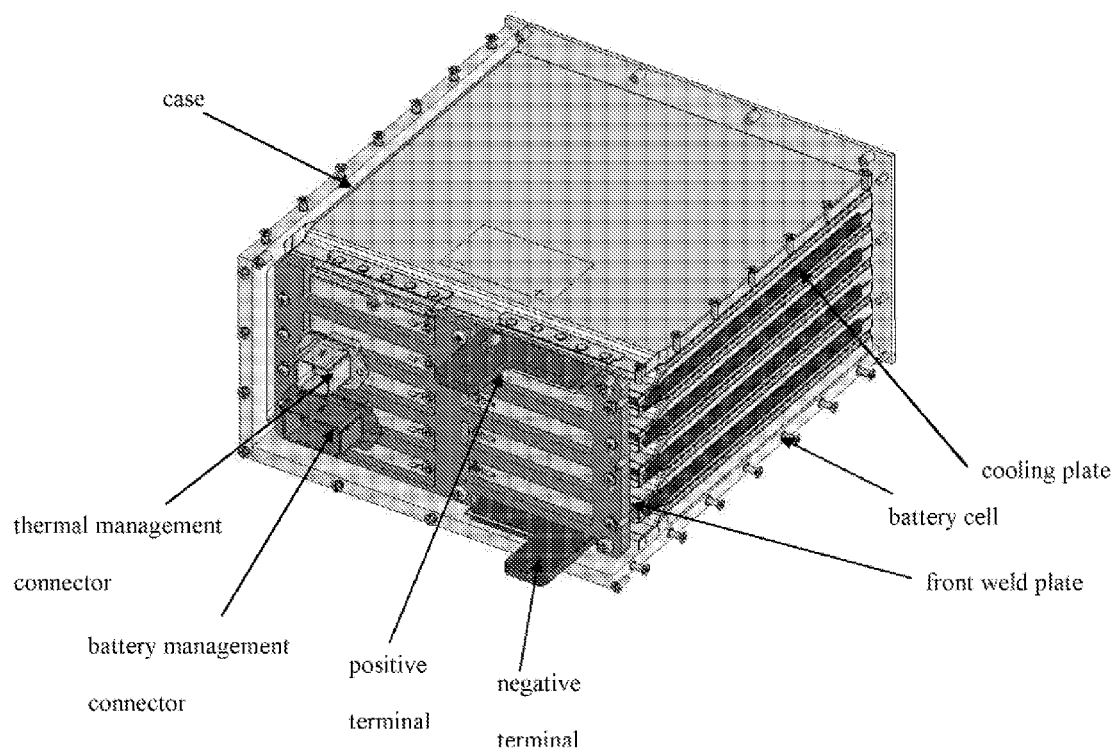
FIG. 13 shows an example of a module in accordance with one embodiment of the invention.

FIG. 13 shows an example of a module in accordance with one embodiment of the invention. The case of a module may be made of an ABS material that can be easily machined and produced very rapidly. In other implementations, the case of a module may be of other materials, such as a composite material, fiberglass, or carbon fiber. In some examples, the case may be made from a material that may provide some level of isolation, such as a material that may not burn when exposed to an electric arc. A front weld plate can be included to accurately locate and hold the terminals to the case to reduce fatigue stress cracks in the cell tabs. In some cases, the cell tabs may be made of a metal, such as aluminum. BMS connectors can be integrated into the front of the module for quick connection of an off-board BMS. Terminals may be offset and tapped for vertical installation of attachment bolts and ease of assembly.

Modules must be isolated from each other to protect against potential short-circuiting. This can be accomplished through careful material selection and post processing of the heat sinks. If a short is ever detected through the BMS, the system may disconnect each pack in the string, which can isolate the fault. This level of safety may be included in the event of a major crash or failure of the isolation system.

Figure 14:
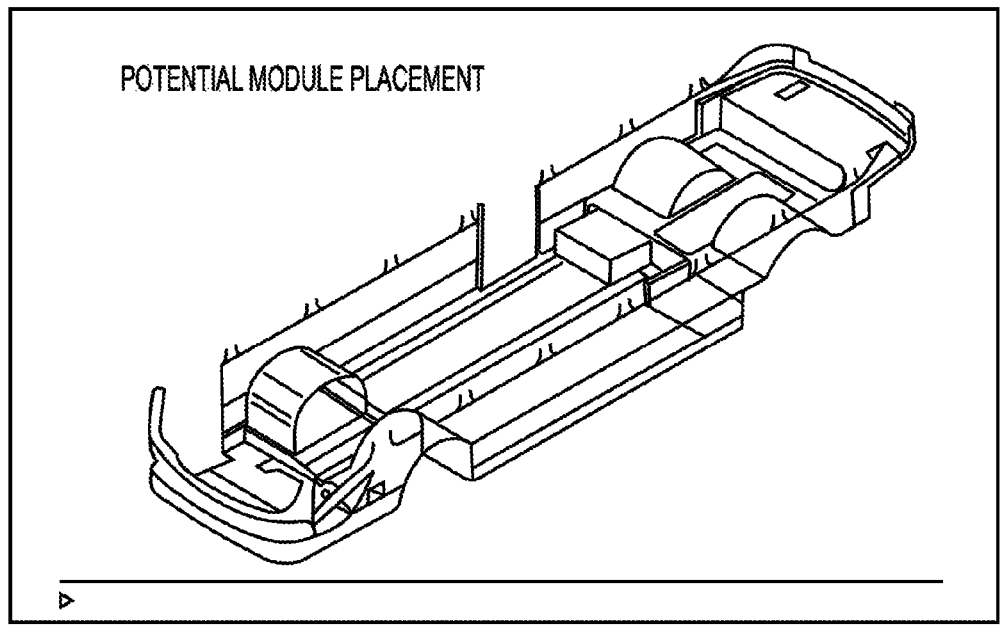
FIG. 14 shows an outline of an undercarriage of a heavy-duty vehicle, such as a bus, with battery modules stored within the floor of the vehicle according to an embodiment of the invention.

FIG. 14 shows an outline of an undercarriage of a heavy-duty vehicle, such as a bus, with battery modules stored within the floor of the vehicle according to an embodiment of the invention. In accordance with some embodiments of the invention, the battery modules may be mounted within a floor cavity of the vehicle. The battery modules may be arranged into groupings that may be individually mounted into floor cavities from below or from the sides of the bus floor structure. In some embodiments of the invention, there may be a plurality of cavities below the heavy-duty vehicle, which may be separated from one another and may contain one or more grouping of battery modules. Alternatively, there may be one cavity below the vehicle, which may contain the groupings of battery modules.

In some embodiments, each battery pack may have its own compartment within the floor of the bus. In some instances, each battery pack may be physically isolated from the other battery packs. Some of the battery packs may be electrically connected to one another in a string, but may otherwise but electrically isolated from one another.

In alternate embodiments of the invention, the batteries may be integrated into other parts of the heavy-duty vehicle. For example, the batteries may be mounted on the front, rear, top, or side of the vehicle. In some implementations, the batteries may be distributed over different locations on the vehicle. For example, some of the batteries may be stored within the floor of the vehicle while some of the batteries may be stored on the top of the vehicle. Any combination of battery storage locations may be used.

Figure 15:
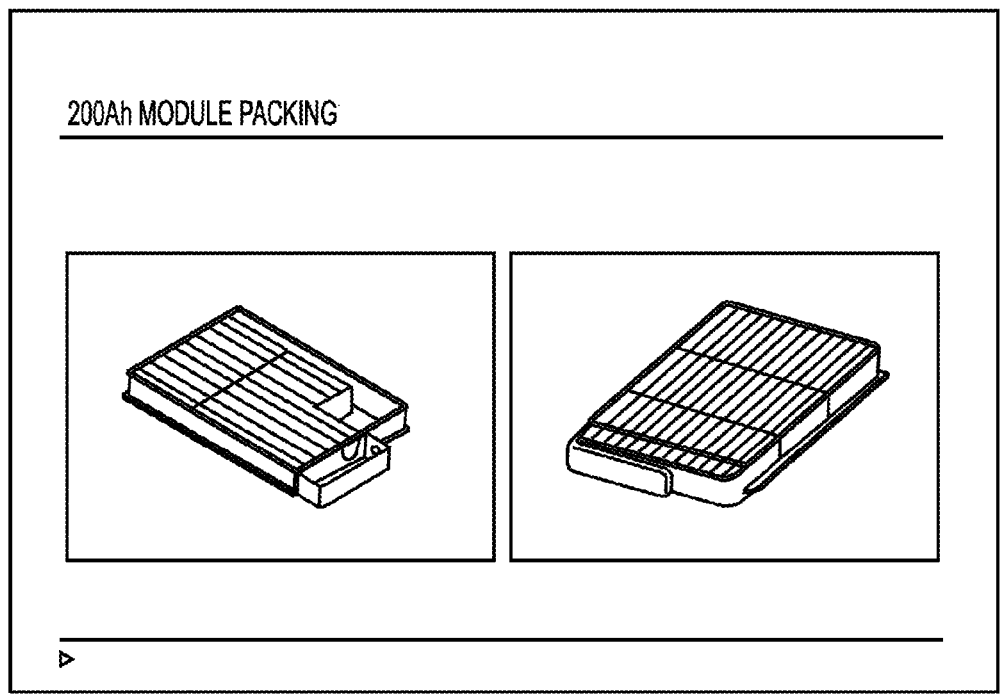
FIG. 15 shows a packaging arrangement of 200 Ah battery cells within a module according to embodiments of the invention.

FIG. 15 shows a packaging arrangement of 200 Ah battery cells within a module according to embodiments of the invention. The battery cells may be arranged in a lengthwise or widthwise configuration, or a mix of both, relative to the orientation of the module. The battery cells may also be stacked upon each other within the module, depending upon the respective dimensions of the battery cells and the module, and allowing for appropriate space for other elements within the battery module that are not shown, such as connections between the battery cells, buss bars, battery management systems, or thermal management systems. The 200 Ah battery cells may utilize a stainless steel can or case design, which optimizes space utilization within the cell while also providing good heat dissipation. The stainless steel case or can design is also robust and may protect the battery cell against potential damage, but may weigh more than other comparable case designs.

Figure 16:
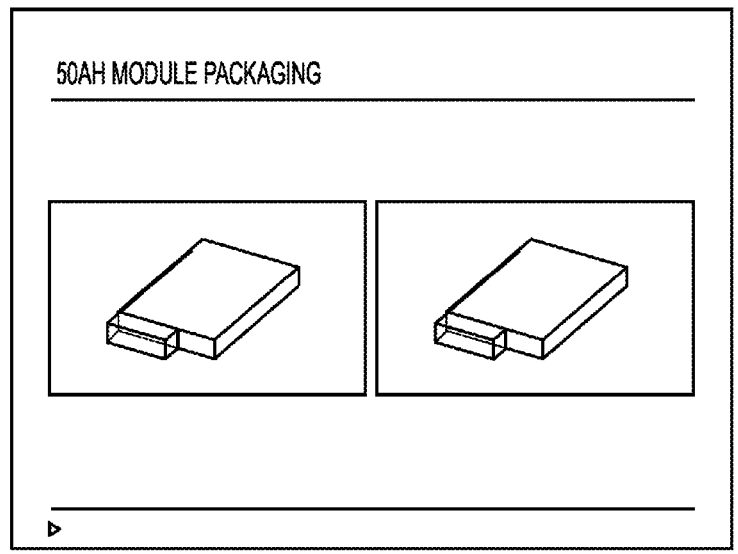
FIG. 16 shows a packaging arrangement of 50 Ah battery cells within a module according to embodiments of the invention.

FIG. 16 shows a packaging arrangement of 50 Ah battery cells within a module according to embodiments of the invention. Similar to the arrangement shown in FIG. 15, the battery cells may be arranged in a lengthwise or widthwise configuration, or a mix of both, relative to the orientation of the module. The battery cells may also be stacked upon each other within the module, depending upon the respective dimensions of the battery cells and the module and allowing for appropriate space for other elements within the battery module that are not shown, such as connections between the battery cells, buss bars, battery management systems, or thermal management systems. The 50 Ah battery cells may utilize an encapsulate packaging which provides for significantly less weight than stainless steel can or case designs. However, the encapsulate packaging may retain more heat and provide less thermal dissipation than other comparable case designs. While not shown, it is also possible to configure the battery cells to be directly placed into battery packs, thus removing the module level.

Additional other types of battery cells may also be used within modules according to embodiments of the invention. For example, prismatic pouch cells or other alternative types may be used. Additional battery cells may also be placed within the module to fit the specific design configuration of the energy storage system, subject to weight and dimensional constraints. The modules may also be stacked upon each other, using cooling plates or other technology to insulate and separate the modules from each other for improved performance.

One common complaint or drawback to upsizing an energy storage system to achieve fast charge rates is that it may result in excess battery capacity that is not actually used if the SOC is only cycled within certain range requirements. This may be viewed by some as wasted use of costly energy storage. However, utilizing such a strategy has potential benefits. For example, having a wide range of usable SOC may allow for different charging strategies during the course of a day.

Figure 17:
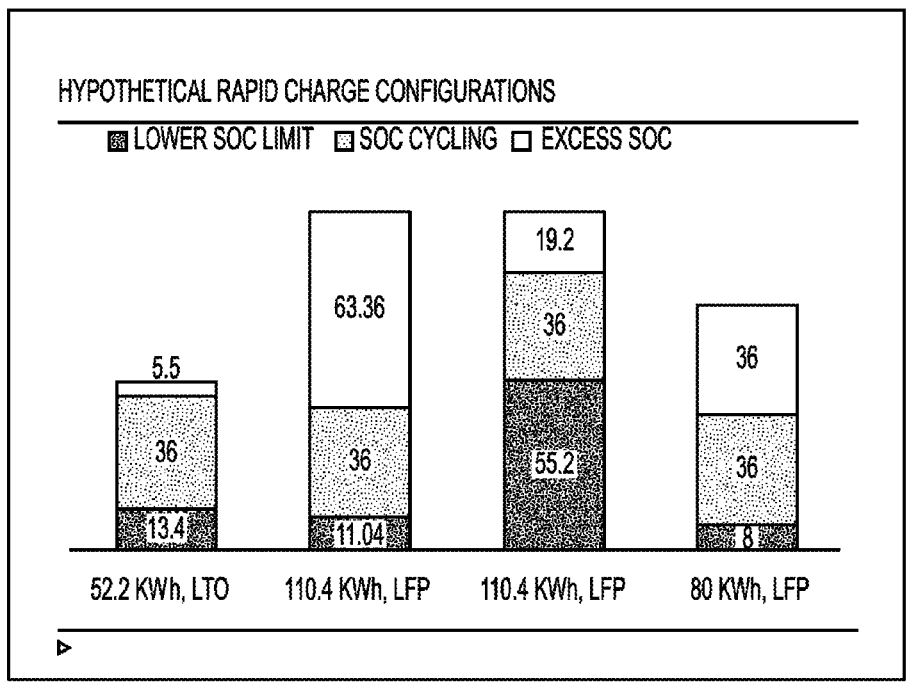
FIG. 17 shows several different rapid charge configurations that can be used for systems of different charge capacities according to embodiments of the invention.

FIG. 17 shows several different rapid charge configurations that can be used for systems of different charge capacities according to embodiments of the invention. The first charge configuration on the left uses an LTO battery chemistry with relatively little excess SOC, which results in the charge configuration being nearly completely filled during each rapid charge. The second charge configuration utilizes an LFP battery chemistry, but is similar to the first in that the SOC cycling range is similar between the two charge configurations, allowing for the use of a similar set charging schedule as used in the first charge configuration. The SOC cycling range can be set to the "sweet spot" of the battery cells used in the energy storage system which may maximize the life of the battery cells and reduce the cost of ownership. For example the optimal cycling range may be from 10-40% of total charge, 20-60% of total charge, or another range, depending upon the battery cells used and the specific configuration used in the energy storage system. The second charge configuration does have a much larger excess SOC which may or may not be used during operation of the system. The third charge configuration shifts the SOC cycling range to a much higher level of the total charge, which can allow for a greater flexibility in whether the electric vehicle must return to recharge. The fourth charge configuration is a smaller system with less charge capacity that has a similar SOC cycling range as the first and second charge configurations, but with a smaller amount of excess SOC than the second charge configuration. Other charge configurations could also be used according to embodiments of the invention, depending upon the total charge capacity of the system, the desired usage of the system and the specific configuration of the system, among other factors. For example, a charge configuration similar to that for the third charge configuration could be used for an 80 kWh system, albeit with a reduced lower SOC limit due to the smaller capacity of the system.

Figure 18:
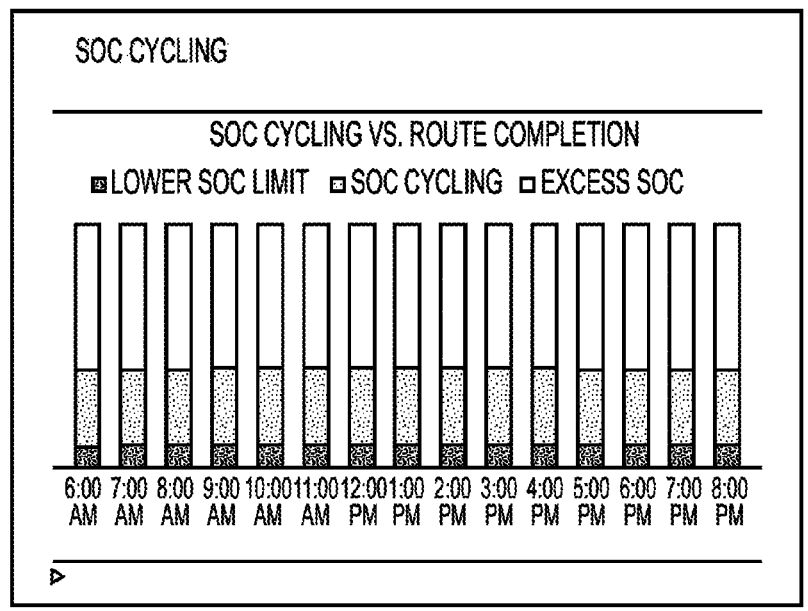
FIG. 18 shows a chart displaying SOC cycling for a set schedule for hourly charging of an electric vehicle on a fixed route according to an embodiment of the invention.

FIG. 18 shows a chart displaying SOC cycling for a set schedule for hourly charging of an electric vehicle on a fixed route according to an embodiment of the invention. Within each predetermined period (an hour in this instance), the electric vehicle travels its route and the SOC of its energy storage system is depleted from the level at the top of the SOC cycling range to a lower level at the conclusion of the route. The vehicle may cycle through its SOC in approximately 30-40% of the lower half of its range every hour. Following route completion, the electric vehicle is rapidly recharged to the top of its SOC cycling level and may continue on its route having a similar SOC as during the beginning of its previous route. The SOC cycling range may be selected to match the "sweet spot" of the battery cells used in the energy storage system, which may maximize the life of the battery cells. An additional advantage of using a set charging schedule is ease of use, as a single charging schedule may be used for the electric vehicle throughout the day and additional charging schedules are not needed. This may reduce the complexity of the programming required for charging, described in more detail below.

Figure 19:
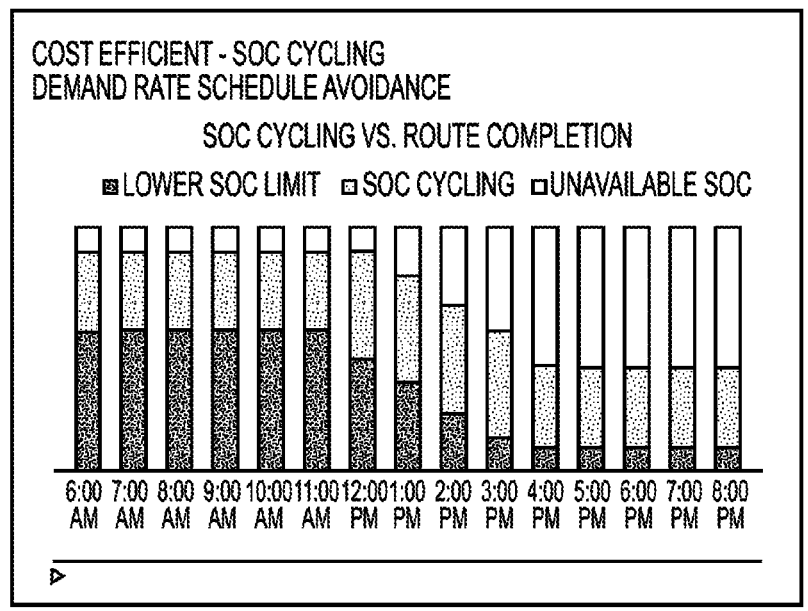
FIG. 19 shows a chart displaying SOC cycling for a variable schedule for hourly charging of an electric vehicle on a fixed route according to an embodiment of the invention.

FIG. 19 shows a chart displaying SOC cycling for a variable schedule for hourly charging of an electric vehicle on a fixed route according to an embodiment of the invention. The excess SOC capacity of the vehicle may allow for some flexibility on when SOC cycling takes place as well as whether a charging event takes place every hour. For example, an electric vehicle may fully charge at night, as shown in the 6:00 AM charge configuration with the vehicle at peak charge. The 6:00 AM charge configuration shows a minimal amount of unavailable SOC, with a large lower SOC limit that may be periodically used to extend the range of the vehicle as needed without needing to return to recharge. For example, a large energy capacity may allow the electric vehicle to be fully charged at night and drive the early morning hours with SOC cycling within the upper half of its range. As the demand rate for electricity increases during the day due to increased utility grid loading, the electric vehicle can make use of the excess SOC onboard to minimize or avoid charging during peak hours, thereby shifting the SOC cycling to the lower half of its range, until the electric vehicle returns to charge or concludes its route at the end of the day. This can reduce the cost of operation for the owner of the electric vehicle by taking advantage of lower electricity rates at night, when demand is lower, as compared to consistently charging the vehicle during the day when the demand rate for electricity is higher.

In another embodiment of the invention, the charge carried in the storage systems of the electric vehicles may also be sold back to the utility grid in times of peak demand when electricity rates are particularly high. This requires that the electric vehicles be docked at their charging station and that appropriate infrastructure and inverters are present to allow the charge to be sold back into the utility grid. This provides additional flexibility to the owner or operator of the electric vehicle and the charging system in that any excess SOC may be returned to the utility grid in times of peak demand at a higher rate, thus lowering the total cost of operation of the electric vehicle. This option may not be present for electric vehicles that were not designed with SOC in excess of their operational requirements, and may need to use all of their SOC to complete their normal transit routes, with little excess SOC available to sell back to the utility grid.

Figure 20:
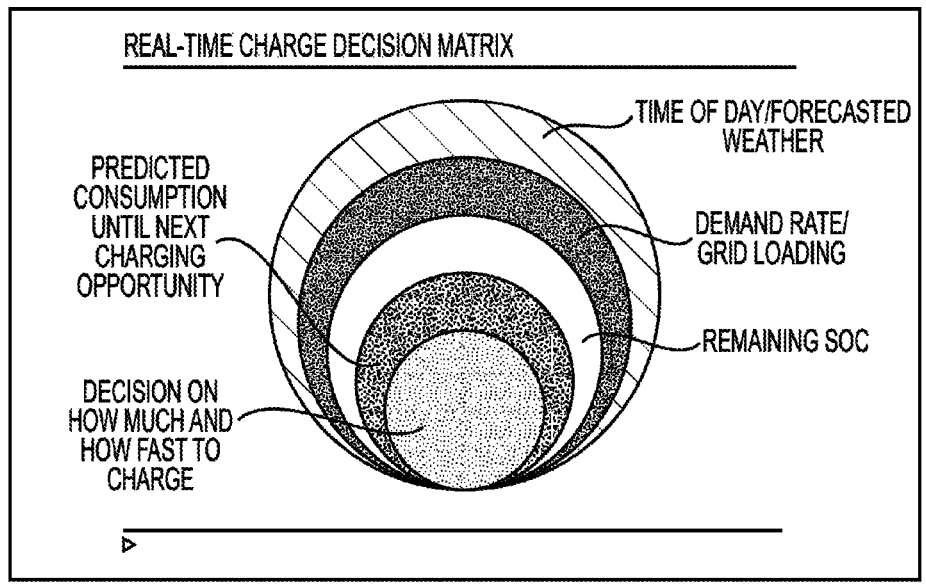
FIG. 20 shows a decision matrix with different considerations that may apply to the real-time charging of an electric vehicle in an embodiment of the invention.

FIG. 20 shows a decision matrix with different considerations that may apply to the real-time charging of an electric vehicle in an embodiment of the invention. The electric vehicle may use a charging and connection system as described in U.S. Patent Application 61/328,152 entitled, Systems and Methods for Automatic Connection and Charging of an Electric Vehicle at a Charging Station, which is hereby incorporated by reference. Implementations of the invention may use an automatic battery charging process control system that controls the charging of the electric vehicle with minimal or no input from the driver. The battery charging process control system may be located on the electric vehicle which communicates with the charging station using either a wireless or wired signal. Alternatively the battery charging process control system may also be located in the charging station, which communicates with signal emitters and transmitters onboard the electric vehicle.

The real-time charge decision matrix may take a number of different factors into account when determining how much and how fast to charge the energy storage system. First, the time of day and forecasted weather may be taken into consideration. Higher temperatures can lead to increased performance, but at the risk of shortened battery cell life, while lower temperatures within the operating range of the battery cells can allow for increased battery cell life. The external thermal effects from forecasted weather and the time of day can be factored into charging calculations, with additional charging taking place if the hot weather is forecasted or during the night or in the early morning to account for reduced battery life later during the day. Conversely, less charging may be performed near the end of the day when temperatures typically are lower, or if cool weather is predicted. Improved thermal management can dramatically improve the life of battery cells by maintaining the operating temperature of the cells within an optimal range, which may be a narrow range around 10° C., 15° C., 20° C., 25° C., 30° C., 35° C., or other ranges. Forecasted weather may also help to predict vehicle HVAC loading and the estimate range of the vehicle as well.

The real-time charge decision matrix may also take into account the demand rate and the load on the utility grid in determining how much and how fast to charge. As described above in relation to FIG. 19, the battery charging process control system may avoid charging at times when the demand rate is high to reduce the cost of operation and have the electric vehicle run instead on the excess SOC contained within the oversized energy storage system. If hot weather is forecasted and the demand rate on the grid is high, the battery charging process control system can reduce the amount of charging at each stop or not charge at all until later on during the day. For example, a decision could be made to charge during a period of peak demand on the utility grid if the predicted range of the electric vehicle is insufficient to reach the next charging station, based on remaining SOC, forecasted weather conditions, predicted consumption, and other factors. If the vehicle can reach the next charging station, then a higher cost charging event may be avoided.

The remaining SOC may also be taken into account in determining whether and how much the electric vehicle should be charged. For example, the electric vehicle may incorporate charge controllers or other circuitry to monitor and determine the remaining SOC left in the system. The amount of SOC may be communicated to the battery charging process control system to determine whether the electric vehicle should be charged and appropriate charging parameters. If there is little remaining SOC left in the energy storage system, the electric vehicle may be rapid charged to refill the SOC level to a usable capacity. If a large amount of SOC remains, the battery charging process control system could decide to recharge the system to maintain the SOC at a high level to provide additional flexibility for operation later during the day, or decide to not charge or only charge the energy storage system a lesser amount. In some instances, the remaining SOC may be communicated to the driver of the vehicle as a display on the vehicle's dashboard indicating the battery SOC in a similar manner as a fuel gauge. For example, after charging, a full fuel gauge may be displayed.

In some embodiments, the predicted consumption until the next charging opportunity may be taken into consideration. For example, a total required charge (kWh) may be tailored based on historical knowledge of energy consumption of vehicle. Historical usage, predicted future requirements, and knowledge of electrical charges and rate schedules may be considered and used to adjust both charge rate and vehicle charging frequency in order to minimize or reduce electrical demand charges and make the most efficient use of on-board energy storage. For example, if the next predicted charge of the vehicle is predicted to occur in a short interval and the battery state of charge is sufficiently high, it may be desirable to provide only minimal charging to the vehicle. In another example, if the next charge is predicted to occur after a long interval, it may be desirable to charge the vehicle more. The electric vehicle's route characteristics such as elevation changes, traffic during different times of the day may also be taken into consideration.

Several advantages may be gained by using a real-time charge decision matrix as opposed to using a set charging schedule. First, lower costs may be obtained by optimizing the rapid charging process to forego charging during the peak times and charge instead when the demand rate and the load on the utility grid is low. Increased battery life and lower capital costs may also be achieved by using other charging methods such as slow charging, split charging, pulsed charging, burp charging, rapid charging, or other charging mechanisms at times when rapid charging is not needed, such as night for electric vehicles that normally operate during the day. An increased travel range may also be obtained by charging the electric vehicle fully when the electric vehicle is to embark on a longer route, or when the predicted consumption of energy before the next charging opportunity is high. The advantages listed herein are not meant to be exclusive, and other advantages may be obtained which are evident to those of skill in the art.

Figure 21:
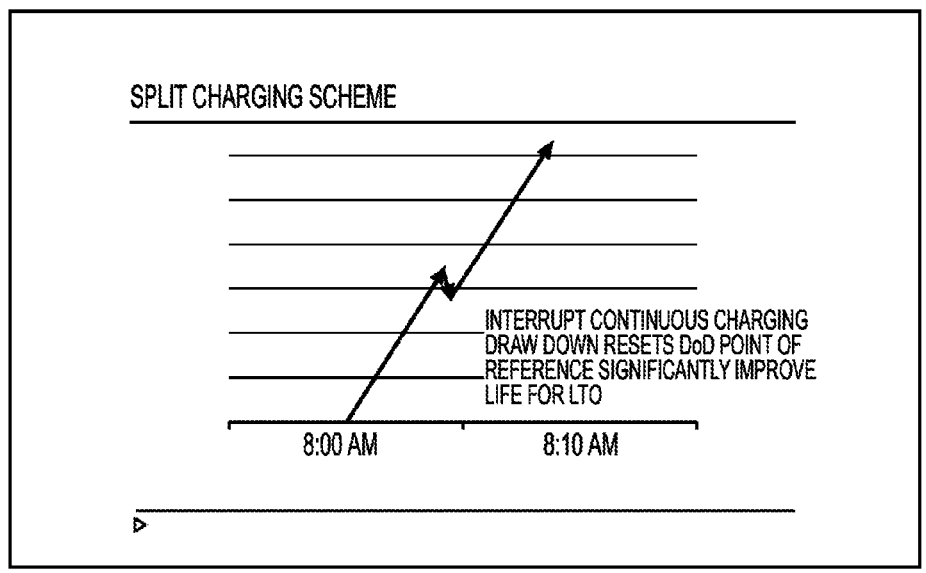
FIG. 21 shows a chart displaying charge levels during a rapid charging event that utilizes a split charging scheme according to an embodiment of the invention

Embodiments of the invention may also use a split charging scheme during rapid charging to improve the life of the battery cells used within an energy storage system. The life of a battery cell may be calculated many different ways: 100% depth of discharge using equivalent charge/discharge rates, 100% depth of discharge using rapid charging/slower discharge rates, <100% depth of discharge, or Cumulative W-h throughput. In general, the life of most battery cells greatly decreases depending upon the depth of discharge (DoD) of the battery in typical usage. For most battery types for example, discharging a battery repeatedly to its depth of discharge may greatly reduce the battery cell life. By restricting the depth of discharge of the battery cells to a higher level, it may be possible to improve the life of the battery cells. FIG. 21 shows a chart displaying charge levels during a rapid charging event that utilizes a split charging scheme according to an embodiment of the invention. At 8:00 AM rapid charging of an energy storage system commences, but the continuous charging is interrupted partway through. The charge level is then drawn down a small amount, and then rapid charging resumes. This draw-down process may be performed a number of different methods that split the charge effectively and quickly without wasting a significant amount of energy, including turning the motors of the vehicle on temporarily, ramping up the vehicle's HVAC, shuttling to an ultra cap or secondary battery, running the charger briefly as a charge sink, or a combination of the above. For example, the charge may be shuttled to an alternate energy storage device, or the charge may be drawn back in by the charger and stored in an energy storage system. For example, charging may resume using similar charging parameters as during the initial rapid charging period, or different parameters may also be used. By splitting or interrupting the rapid charging process with a brief draw down period, the DoD point of reference may be reset, thus improving the life of the battery cells.

While embodiments of this invention have been described in the context of electrical vehicle charging systems used in heavy-duty electric vehicles, other embodiments of this application may be applicable to any application requiring rapid charging of an energy storage system. In addition to usage in transit systems, embodiments of the application could also be used in any vehicle application that runs on a total cost of ownership proposition, runs a fixed route, benefits from rapid charging, or is less concerned about the initial purchase price of the vehicle.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

All concepts of the invention may be incorporated or integrated with other systems and methods of battery management, including but not limited to those described in U.S. Patent Publication No. 2008/0086247 (Gu et al.), which is hereby incorporated by reference in its entirety.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description below. In addition, embodiments of the invention are not described with reference to any particular processor, programming language, machine code, etc. It will be appreciated that a variety of programming languages, machine codes, etc. may be used to implement the teachings of the invention as described herein.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' above,'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventor contemplates the various aspects of the systems and methods in any number of claim forms. Accordingly, the inventor reserves the right to add additional claims after filing the application to pursue such additional claim forms for other aspects of the systems and methods.

What is claimed is:

1. A method of charging an energy storage system of an electric bus at a charging station, the bus being configured to operate along a route and be charged at multiple charging events along the route, the method comprising:

electrically connecting the bus with the charging station for a first charging event of the multiple charging events;

receiving, at a control system, information relating to charging, the information including at least (a) a current state of charge of the bus and (b) information related to the route of the bus;

determining using the control system, based at least on the received information, an amount of energy needed by the bus until a second charging event, the second charging event being a charging event subsequent to the first charging event; and charging the energy storage system with the determined amount of energy at the first charging event, wherein the charging includes:

(i) providing a first amount of energy to the energy storage system, the first amount of energy being smaller than the determined amount of energy;

(ii) discharging a second amount of energy from the energy storage system after providing the first amount of energy, the second amount of energy being smaller than the first amount of energy; and (iii) providing a third amount of energy to the energy storage system after the discharging, the third amount of energy being a remaining amount of energy needed to charge the energy storage system with the determined amount of energy; and electrically disconnecting the bus from the charging station after the first charging event.

2. The method of claim 1, wherein the determining further includes establishing what charging rate should be used to provide the determined amount of energy.

3. The method of claim 1, wherein the receiving information further includes receiving information related to (c) a current time of day of the first charging event, and (d) a forecasted weather along the route of the bus.

4. The method of claim 3, wherein the receiving information further includes receiving information related to (e) the demand rate of electricity supplied to the charging station at the current time.

5. The method of claim 1, wherein the receiving information further includes receiving information related to a route profile of the bus between the first charging event and the second charging event.

6. The method of claim 1, wherein the receiving information further includes receiving information related to a load on the utility grid supplying the charging station during the first charging event.

7. The method of claim 1, wherein the receiving information includes receiving information from the bus and receiving information from an external source remote from the bus and the charging station.

8. The method of claim 1, wherein determining the amount of energy includes determining the amount of energy based on at least a forecasted weather condition along the route of the bus.

9. The method of claim 8, wherein determining the amount of energy includes increasing the determined amount of energy when hot weather is forecasted compared to when cooler weather is forecasted.

10. The method of claim 1, wherein determining the amount of energy includes increasing the determined amount of energy during the night and early morning as compared to other times.

11. A method of charging an energy storage system of an electric bus at a charging station, the bus being configured to operate along a route and be charged at a first charging event and a second charging event subsequent to the first charging event along the route, the method comprising:

electrically connecting the bus with the charging station for the first charging event;

receiving, at a control system, information relating to charging, the information including at least (a) a current state of charge of the bus, (b) distance to the second charging event, and (c) demand rate of electricity at a current time;

determining using the control system, based at least on the received information, (i) an amount of energy needed by the bus to reach the second charging event and (ii) a rate of charging; and charging the energy storage system with the determined amount of energy during the first charging event, wherein the charging includes:

(i) providing a first amount of energy to the energy storage system at the determined rate, the first amount of energy being smaller than the determined amount of energy;

(ii) discharging a second amount of energy from the energy storage system after providing the first amount of energy, the second amount of energy being smaller than the first amount of energy; and (iii) providing a third amount of energy to the energy storage system after the discharging, the third amount of energy being a remaining amount of energy needed to charge the energy storage system with the determined amount of energy; and electrically disconnecting the bus from the charging station after the first charging event.

12. The method of claim 11, wherein the receiving information further includes receiving information related to (d) a forecasted weather along the route of the bus, and (e) information related to the route of the bus.

13. The method of claim 12, wherein determining the amount of energy needed by the bus includes increasing the determined amount of energy when hot weather is forecasted compared to when cooler weather is forecasted.

14. The method of claim 11, wherein determining the amount of energy needed by the bus further includes determining the amount of energy based on historical passenger load data of the bus.

15. The method of claim 11, wherein determining the amount of energy needed by the bus further includes determining the amount of energy based on an historical HVAC usage data of the bus.

16. A method of charging an energy storage system of an electric bus at a charging station, the bus being configured to be charged at multiple charging events along a route, the method comprising:

electrically connecting the bus with the charging station for a first charging event of the multiple charging events;

receiving, at a control system, information relating to charging, the information including at least (a) a current state of charge of the bus (b) information related to the route of the bus, (c) forecasted weather along the route, and (d) a current cost of electricity;

determining using the control system, based at least on the received information, (i) an amount of energy needed by the bus until a second charging event subsequent to the first charging event, and (ii) a charging rate; and charging the energy storage system with the determined amount of energy during the first charging event, wherein the charging includes:

(i) providing a first amount of energy to the energy storage system, the first amount of energy being smaller than the determined amount of energy;

(ii) discharging a second amount of energy from the energy storage system after providing the first amount of energy, the second amount of energy being smaller than the first amount of energy; and (iii) providing a third amount of energy to the energy storage system after the discharging, the third amount of energy being a remaining amount of energy needed to charge the energy storage system with the determined amount of energy; and electrically disconnecting the bus from the charging station after the first charging event.

17. The method of claim 16, wherein determining the amount of energy needed by the bus includes increasing the determined amount of energy when hot weather is forecasted compared to when cooler weather is forecasted.

18. The method of claim 16, wherein determining the amount of energy needed by the bus includes increasing the determined amount of energy during the night and early morning as compared to other times.

19. The method of claim 16, wherein determining the amount of energy needed by the bus further includes determining the amount of energy based on an historical HVAC usage data of the bus.

20. The method of claim 16, wherein determining the amount of energy needed by the bus further includes determining the amount of energy based on historical passenger load data of the bus.

* * * * *